US011260981B2

(12) United States Patent
Bachmann

(10) Patent No.: US 11,260,981 B2
(45) Date of Patent: Mar. 1, 2022

(54) AUTOMATIC SAFETY PARACHUTE DEPLOYMENT SYSTEM FOR MULTI ROTOR DRONES

(71) Applicant: Helmuth G. Bachmann, Salinas, CA (US)

(72) Inventor: Helmuth G. Bachmann, Salinas, CA (US)

( * ) Notice: Subject to any disclaimer, the term of this patent is extended or adjusted under 35 U.S.C. 154(b) by 533 days.

(21) Appl. No.: 16/272,631

(22) Filed: Feb. 11, 2019

(65) Prior Publication Data

US 2020/0255157 A1    Aug. 13, 2020

(51) Int. Cl.
*B64D 17/80* (2006.01)
*B64C 39/02* (2006.01)
*B64D 17/64* (2006.01)

(52) U.S. Cl.
CPC ............ *B64D 17/80* (2013.01); *B64C 39/024* (2013.01); *B64D 17/64* (2013.01); *B64C 2201/185* (2013.01)

(58) Field of Classification Search
CPC ........ B64D 17/62; B64D 17/64; B64D 17/70; B64D 17/72; B64D 17/80; B64C 2201/185
See application file for complete search history.

(56) References Cited

U.S. PATENT DOCUMENTS

| 2,312,629 | A | * | 3/1943 | Kenneth | A63H 33/20 446/51 |
|---|---|---|---|---|---|
| 3,395,881 | A | * | 8/1968 | Ferguson | B64D 17/00 244/139 |
| 4,004,764 | A | | 1/1977 | Burklund et al. | |
| 4,005,544 | A | * | 2/1977 | Donner | A63H 33/20 446/51 |
| 5,407,375 | A | * | 4/1995 | Johnson | A63H 27/005 446/486 |
| 5,951,354 | A | * | 9/1999 | Johnson | A63H 27/14 446/52 |
| 9,981,749 | B1 | | 5/2018 | Swan et al. | |
| 2005/0040290 | A1 | * | 2/2005 | Suhami | B64D 17/72 244/146 |
| 2016/0251083 | A1 | | 9/2016 | Tsaliah et al. | |
| 2018/0244394 | A1 | * | 8/2018 | Lee | B64C 39/024 |
| 2019/0092468 | A1 | * | 3/2019 | Deutsch | B64D 1/22 |

* cited by examiner

*Primary Examiner* — Richard R. Green
*Assistant Examiner* — Arfan Y. Sinaki

(57) ABSTRACT

This invention relates to the use of an automatic safety parachute deployment system for drones (UAVs), which utilizes an airflow trigger that deploys one or more parachutes under certain aerodynamic conditions from the upward airflow during a flight malfunction. The system is mechanically activated without the use of electronics, batteries or an ejection spring which reduces the complexity and weight.

9 Claims, 3 Drawing Sheets

AUTOMATIC SAFETY PARACHUTE DEPLOYMENT SYSTEM FOR MULTI ROTOR DRONES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to an automatic safety parachute deployment system that provides a lighter and simpler parachute deployment mechanism for drones (UAVs) in order to prevent bodily harm to people and or damage to structures from a flight malfunction, and comply with FAA regulations including BLOS flights. The existing self-contained automatic parachute systems utilize electronic motion senors such as accelerometers to determine when to trigger the deployment of a parachute during a flight malfunction. These electronic systems can have significant deployment delay in order to avoid accidental triggering during rapid changes in altitude and tilt angle (generally beyond 80 degrees). If tilt angle is only used, deployment may not trigger during a complete power failure on a portable drone that has small legs which can fall stably in a horizontal position. They also add substantial weight and cost to a drone (UAV) with the electronics and dedicated battery which has to be maintained Other manual systems that are triggered by the operator may not be triggered in time because of possible distractions and evaluation and response times for deployment, especially when using FPV. These systems are not triggered by the direction of airflow as described in the embodiment for this invention. Two existing systems that do trigger with airflow are described in U.S. Pat. Nos. 2,312,629A and 5,407,375A for model rockets or toys. Although, they only trigger with reduced airflow pressure when the rocket slows down at the top of it's trajectory traveling in one direction, and not with a change in airflow direction and increased speed from a descent as in the embodiment for this invention.

BRIEF SUMMARY OF THE INVENTION

It is the object of this invention to disclose the drawbacks of existing prior art for automatic electronic parachute deployment systems to prevent damage to people and structures in the surroundings.

It is a further object to the present invention to provide a parachute deployment system that weighs substantially less and is more compact and less expensive then existing prior art for automatic electronic parachute deployment systems.

It is a further object to the present invention to provide a parachute deployment system that is easily attached and detached and can be used on different drones.

BRIEF DESCRIPTION OF THE SEVERAL VIEWS OF THE DRAWING

Corresponding reference numerals designate corresponding parts throughout several views of the drawings.

DETAILED DESCRIPTION OF THE INVENTION

Figure 1:
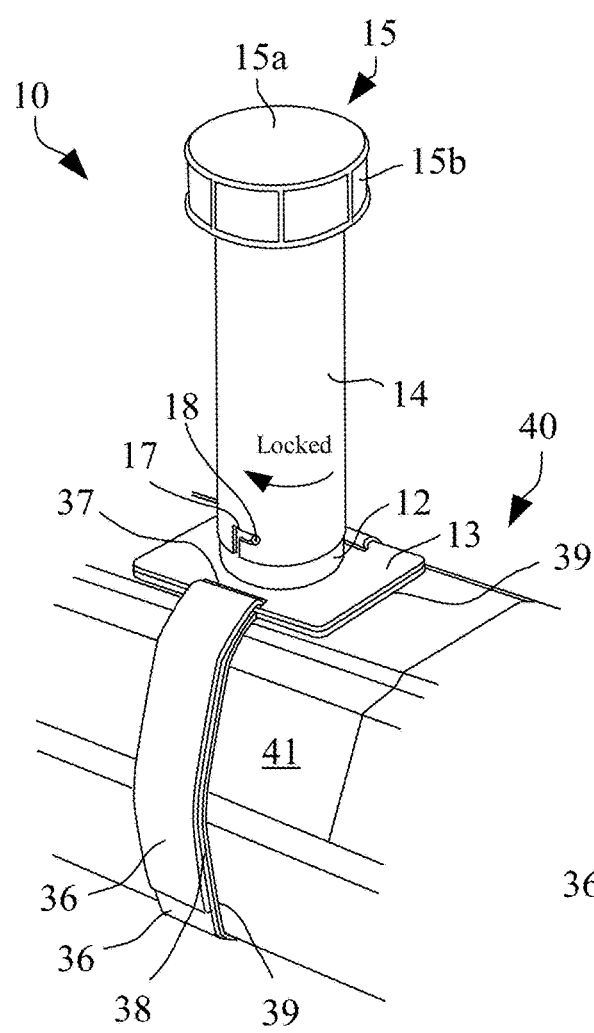
FIG. 1 is a side perspective view of a parachute deployment system embodying the invention with the housing cover locked in place when not in use and a partial view of a drone body.
Figure 2:
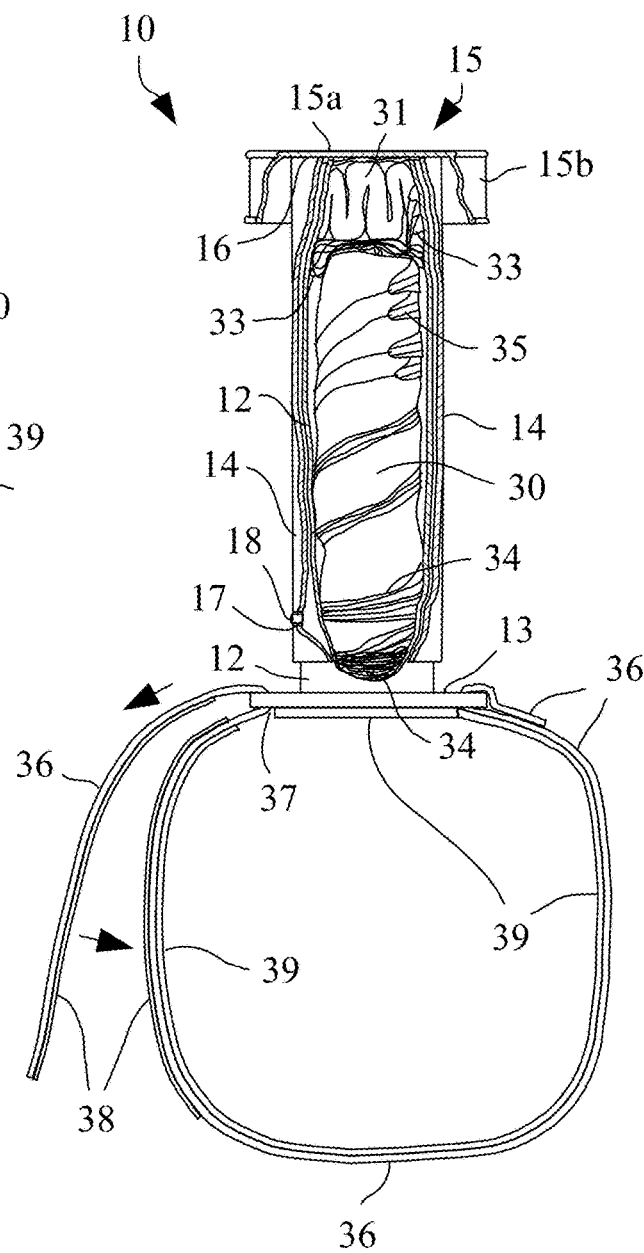
FIG. 2 is a rear cut away view of a parachute deployment system with the housing cover locked in place when not in use.
Figure 3:
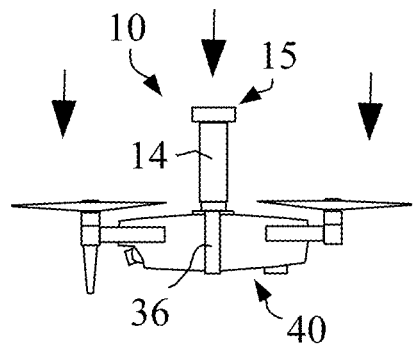
FIG. 3 is a side view of a parachute deployment system and drone in flight with the housing cover unlocked ready for use.
Figure 4:
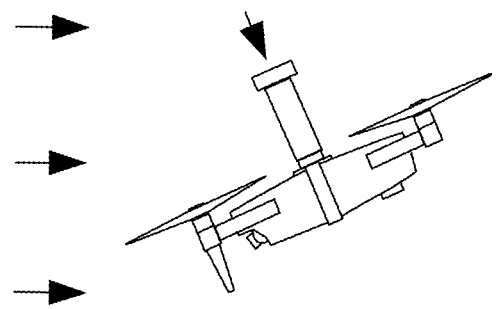
FIG. 4 is a side view of a parachute deployment system and drone in flight.
Figure 5:
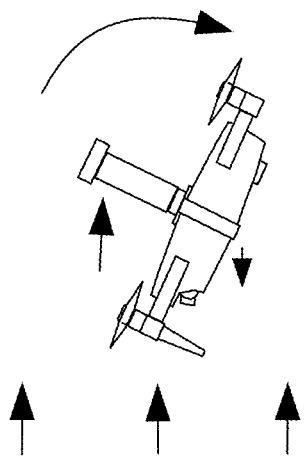
FIG. 5 is a side view of a parachute deployment system and drone with a flight malfunction.
Figure 6:
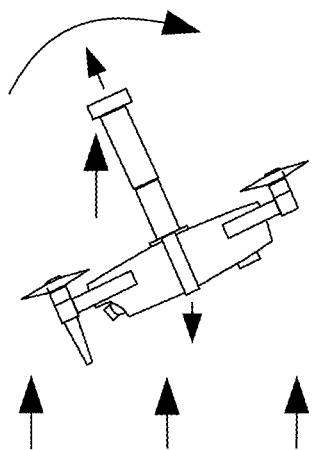
FIG. 6 is a side view of a parachute deployment system and drone with a flight malfunction.
Figure 7:
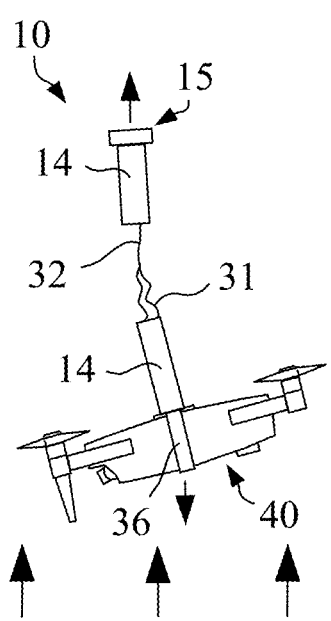
FIG. 7 is a side view of a parachute deployment system and drone with a flight malfunction.
Figure 8:
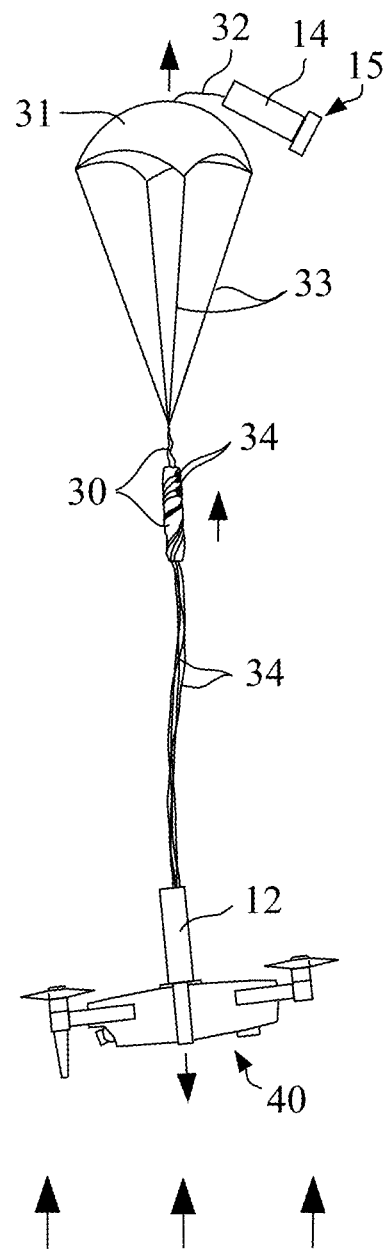
FIG. 8 is a side view of a parachute deployment system and drone with a flight malfunction and the deployment of parachutes.
Figure 9:
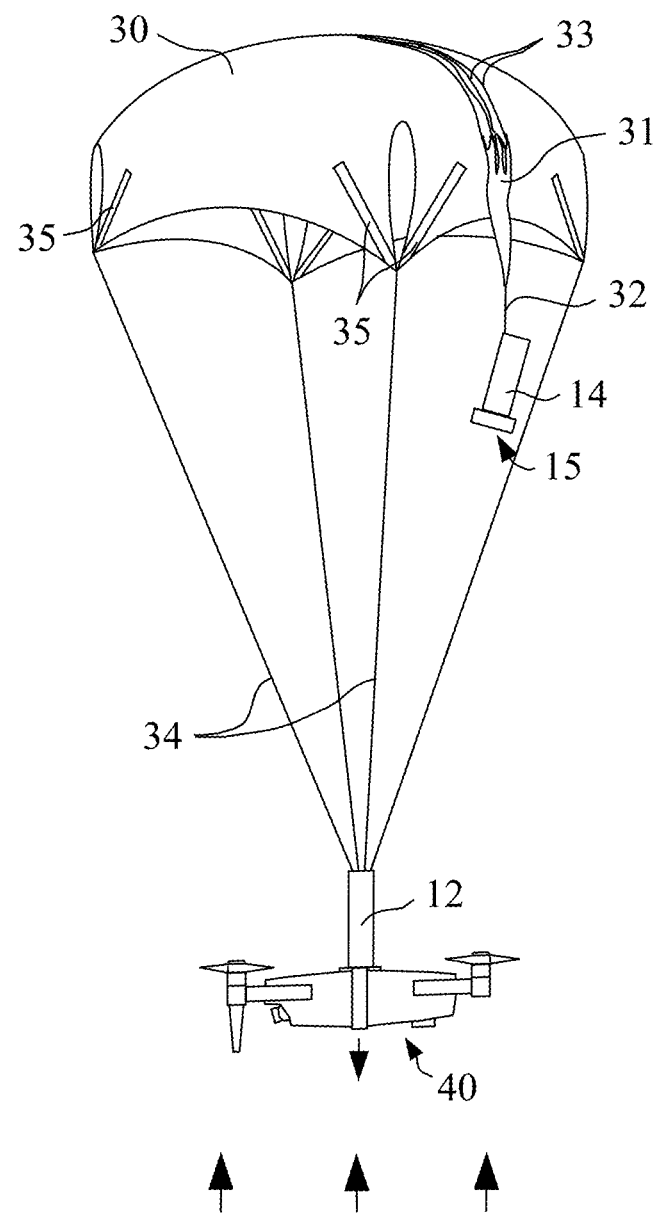
FIG. 9 is a side view of a parachute deployment system and drone with a flight malfunction and the deployment of parachutes.

Referring now to the drawings, and more particularly to FIGS. 1 and 2, a safety parachute deployment system 10 for a drone 40 with a body 41, comprised of one or more parachutes housed in a parachute housing 12 with a flat base 13 and housing cover 14, which opens under certain aerodynamic conditions from the upward force on an airflow trigger 15, which deploys one or more parachutes during a flight malfunction. For fast deployment, a parachute deployment spring with a mechanically triggered housing cover 14 (not shown) known to the state of the art can be utilized with an airflow trigger 15 to release the housing cover 14. Although, for the preferred embodiment the deployment design is simpler and utilizes a pilot parachute 31 for fast deployment of a main parachute 30 without using electronics or a spring for ejection, which reduces weight, complexity, magnetic interference and cost (especially for smaller drones) as shown in FIGS. 1 and 2. The airflow trigger 15 has a circular cap shape with a substantially flat top 15*a* and a substantially orthogonal cylindrical lip 15*b* that is adjacent and coaxial to the cylindrical housing cover 14 and is mounted on the housing cover 14 with glue 16. Together they slide over the cylindrical parachute housing 12 sealing the top end with the main parachute 30 and pilot parachute 31 inside. When not in use the housing cover 14 is locked in place by sliding an "L" shaped notch 17 in the housing cover 14 down along an internal hex head screw 18 head on the parachute housing 12, then rotated to lock in place. To activate or arm for flight, the housing cover 14 is rotated in the opposite direction and up, this also exposes text (not shown) on the parachute housing 12 that indicates it's armed and ready for use. Underneath the text and up to the top of the parachute housing 12 is colored orange (not shown) which is exposed after deployment of the housing cover 14 so that the drone 40 can be spotted on the ground from a distance. The parachutes will not deploy under normal flight conditions because the downward air pressure from the drone 40 rotor/propeller wash and oncoming airflow (large parallel arrows) keeps the airflow trigger 15 in place while hovering or when tilted either traveling or compensating for winds, as shown in FIGS. 3 and 4. Also, the tilt angle of the drone 40 and thus the parachute housing 12 forces the mass of the pilot parachute 31 and main parachute 30 down into to the parachute housing 12 especially during fast stops. During a drone 40 flight malfunction the tilt angle and aerodynamics of the drone 40 changes as the drone 40 drops and the high placement of the parachute deployment system 10 rotates the drone 40 so that the airflow trigger 15 lifts up relative to the parachute housing 12 with substantial airflow (large parallel arrows) directly on the bottom, which lifts and opens the housing cover 14 as shown in FIGS. 5 through 7 respectively. At high speeds the airflow will be mostly coming from the front when the drone 40 housing cover 14 opens. Ready for deployment the top end of the folded pilot parachute 31 is attached to the airflow trigger 15 with a pilot line 32 and the pilot parachute lines 33 are attached to the top end of the main parachute 30, and placed in the parachute housing 12 above the folded and rolled main parachute 30 and main parachute lines 34 which are attached to the parachute housing 12, as shown in FIG. 2. When deployed in the airflow (large parallel arrows) the pilot parachute 31 pulls the main parachute 30 out of the parachute housing 12 and helps unroll and unfold it as shown in FIGS. 8 and 9. Deployment may also occur during the quick rotation of a drone 40 during a single rotor malfunction and the centrifugal force ejects the airflow trigger 15, housing cover 14 and parachutes from the parachute housing 12. The pilot parachute 31 and main parachute 30 are made of polypropylene film which folds/rolls compactly and easily slides out of the parachute housing 12 and provides flotation in a water recovery for wet restoration or an insurance claim. For the implementation on a smaller drone 40 there are four pilot parachute lines 33 and four main parachute lines 34 each with a reinforcement 35; this design is less likely to tangle and uses up less space/weight. The parachutes can also be made of commonly used rip stop nylon known to the state of the art for parachutes. Also, the high placement of the parachute deployment system prevents rotor entanglement and the high parachute attachment point helps maintain horizontal positioning of the drone 40 for safer landings.

The parachute deployment system 10 can be permanently attached to a drone 40, although in order for it to be used on different drones the preferred embodiment is detachable and different sizes are provided according to the weight of the drone 40. The attachment of the parachute deployment system 10 is comprised of a strap 36 mounted to the base 13 of the parachute housing 12 at one end and the other end is quickly looped around the body 41 of the drone 40, then through a loop slot 37 in the flat base 13 of the parachute housing 12 and tightened to fit the girth, then secured in place with the hook and loop fasteners 38 on the strap 36 as shown in FIGS. 1 and 2. Detachment is also quick and necessary in order to change the battery between flights on some drones. When attached the flat base 13 is designed to provide torsional support for the parachute housing 12 and has rubber grip pads 39 which are also on the strap 36 to prevent slippage and protect the drone's body 41, and the strap 36 can be placed to avoid bottom sensors. The parachute deployment system 10 can also be attached to a play-load for approved parachute drops from a drone 40.

The present invention has been fully described by way of example with the accompanying drawings. Various alterations and changes can be made without departing from the spirit and broader aspects of the invention as set forth in the appending claims, which are to be interpreted in accordance with the principles of patent law including the doctrine of equivalents.

I claim:

1. A parachute deployment system provided for a drone with a body comprising: an airflow trigger and a parachute housing attached to said body of said drone with a flat base and a housing cover that contains one or more parachutes each having a top end and parachute lines that are attached to said parachute housing, wherein said airflow trigger moves upward relative to said parachute housing and said drone from an upward airflow during a fall from a flight malfunction of said drone and generates an upward force on said airflow trigger that pulls to open said housing cover for a deployment of said one or more parachutes from said parachute housing into the upward airflow which pulls on and opens said one or more parachutes.

2. The parachute deployment system recited in claim 1 further comprises a pilot line with one end attached to said airflow trigger and said airflow trigger is integrally mounted on top of said housing cover and the other end of said pilot line is attached to said top end of said one or more parachutes, wherein said housing cover slides off said parachute housing from said upward force on said airflow trigger and said pilot line pulls and deploys one or more parachutes from said parachute housing during the fall from the flight malfunction of said drone.

3. The parachute deployment system in claim 2 wherein said parachute housing and said housing cover are cylindrical in shape and said airflow trigger has a circular cap shape with a substantially flat top and a substantially orthogonal cylindrical lip that is adjacent and coaxial to said housing cover.

4. The parachute deployment system in claim 3 further comprises an "L" shaped notch in said housing cover and an internal hex head screw on said parachute housing, wherein said housing cover is locked in place by sliding said "L" shaped notch down along said internal hex head screw head on said parachute housing then rotated to lock in place when not in use.

5. The parachute deployment system recited in claim 2 wherein said one or more parachutes comprises a pilot parachute with pilot parachute lines and a main parachute with main parachute lines and said top end of said pilot parachute is attached to said other end of said pilot line and said pilot parachute lines to said top end of said main parachute, wherein said pilot parachute when deployed pulls and deploys said main parachute from said parachute housing.

6. The parachute deployment system in claim 5 further comprises a reinforcement for each attachment of said main parachute lines and said main parachute and said pilot parachute each have four said parachute lines.

7. The parachute deployment system in claim 1 further comprises a strap mounted on said flat base of said parachute housing, wherein said parachute housing is strapped onto said body of said drone and can be attached or detached from said body.

8. The parachute deployment system in claim 7 further comprises a loop slot in said flat base and hook and loop fasteners on said strap with one end mounted on said flat base and the other end that is not mounted, wherein said other end of said strap is looped around said body of said drone and passed through said loop slot then tightened and secured in place by said hook and loop fasteners on said strap.

9. The parachute deployment system in claim 7 further comprises foam rubber grip pads on said flat base and said strap, wherein said rubber grip pads firmly grip said body of said drone.

\* \* \* \* \*